US012771933B2

(12) United States Patent

Takao et al.

(10) Patent No.: US 12,771,933 B2

(45) Date of Patent: Oct. 20, 2026

(54) IMAGE PICKUP APPARATUS, ITS CONTROL METHOD, AND STORAGE MEDIUM

(71) Applicant: CANON KABUSHIKI KAISHA, Tokyo (JP)

(72) Inventors: Yumi Takao, Chiba (JP); Nobutaka Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 19/083,646

(22) Filed: Mar. 19, 2025

(65) Prior Publication Data

US 2025/0338013 A1 Oct. 30, 2025

(30) Foreign Application Priority Data

Apr. 26, 2024 (JP) ................................ 2024-072020

(51) Int. Cl.

*H04N 23/67* (2023.01)

*H04N 23/55* (2023.01)

(52) U.S. Cl.

CPC ............. *H04N 23/67* (2023.01); *H04N 23/55* (2023.01)

(58) Field of Classification Search

CPC .... H04N 23/55; H04N 23/675; H04N 23/672; H04N 23/67

USPC ..................................................... 348/207.99

See application file for complete search history.

(56) References Cited

U.S. PATENT DOCUMENTS 9,392,162 B2 * 7/2016 Tamaki .................... G02B 7/28
9,918,003 B2 * 3/2018 Inoue ................... H04N 23/673
10,122,911 B2 11/2018 Takao
10,148,863 B2 * 12/2018 Takao .................. H04N 13/218
10,257,408 B2 * 4/2019 Inoue ..................... G02B 7/285
10,326,924 B2 6/2019 Takao
11,082,604 B2 8/2021 Takao
11,924,548 B2 3/2024 Takao et al.
11,968,446 B2 * 4/2024 Takao .................. H04N 23/635
12,489,877 B2 * 12/2025 Takahashi .............. G03B 35/12
12,598,382 B2 * 4/2026 Kitsunai ................ H04N 23/67

(Continued)

FOREIGN PATENT DOCUMENTS

JP 2022-189536 A 12/2022
JP 2023-083876 A 6/2023

OTHER PUBLICATIONS

U.S. Appl. No. 19/070,686, filed Mar. 5, 2025 (First Named Inventor: Nobutaka Mizuno).

*Primary Examiner* — Pritham D Prabhakher

(74) *Attorney, Agent, or Firm* — Venable LLP

(57) ABSTRACT

An image pickup apparatus includes a processor configured to control an imaging optical system based on a defocus amount from an image sensor. In a case where the imaging optical system is a first lens apparatus having a plurality of optical axes and includes a first optical system and a second optical system arranged in parallel with the first optical system, the processor is configured to control the imaging optical system based on one of a first defocus amount in a first AF area by the first optical system or a second defocus amount in a second AF area by the second optical system, and determine whether to use the first defocus amount or the second defocus amount in controlling the imaging optical system according to information on a first optical axis of the first optical system and information on a second optical axis of the second optical system.

12 Claims, 9 Drawing Sheets

(56) References Cited

U.S. PATENT DOCUMENTS

| | | | | |
|---|---|---|---|---|
| 2012/0154670 | A1* | 6/2012 | Hamamura | H04N 13/296 348/E5.045 |
| 2015/0281558 | A1* | 10/2015 | Tamaki | G02B 7/28 348/208.12 |
| 2016/0134802 | A1* | 5/2016 | Inoue | H04N 23/672 348/349 |
| 2017/0163875 | A1* | 6/2017 | Takao | H04N 25/134 |
| 2017/0230567 | A1* | 8/2017 | Takao | G02B 7/346 |
| 2017/0374271 | A1* | 12/2017 | Takao | G02B 7/34 |
| 2018/0160029 | A1* | 6/2018 | Inoue | H04N 23/673 |
| 2020/0389598 | A1* | 12/2020 | Takao | H04N 23/672 |
| 2022/0400208 | A1* | 12/2022 | Takao | H04N 23/635 |
| 2023/0300462 | A1* | 9/2023 | Takao | H04N 23/635 348/349 |
| 2024/0388686 | A1* | 11/2024 | Takahashi | G03B 35/12 |
| 2024/0414436 | A1* | 12/2024 | Kitsunai | H04N 23/67 |

* cited by examiner

IMAGE PICKUP APPARATUS, ITS CONTROL METHOD, AND STORAGE MEDIUM

BACKGROUND

Technical Field

The present disclosure relates to an image pickup apparatus, its control method, and a storage medium.

Description of Related Art

An image pickup apparatus capable of capturing stereoscopically viewable images, such as a head mount display (HMD), has conventionally been known. Japanese Patent Application Laid-Open No. 2022-189536 discloses a method of calculating an adjustment value and a method of displaying a focus evaluation value of an object in phase-difference autofocus (AF) in a stereoscopic image pickup apparatus. Japanese Patent Application Laid-Open No. 2023-83876 discloses a method of performing phase-difference autofocus independently in each of two, left and right, optical systems.

In a case where a lens apparatus having two optical systems is attached to an image pickup apparatus having a single image sensor, the center position of the image sensor may shift from each optical axis position of the two optical systems. In performing phase difference AF using such a configuration, there are two candidates for the position of the AF area (focus detecting area) by the two optical systems. However, in a case where the center position of the image sensor shifts from each optical axis positions of the two optical systems, the AF accuracy may decrease depending on the position of the AF area. Thus, the methods disclosed in Japanese Patent Application Laid-Open Nos. 2022-189536 and 2023-83876 have difficulty in achieving high focus detecting accuracy in controlling two optical systems.

SUMMARY

An image pickup apparatus according to one aspect of the present disclosure includes an image sensor having a plurality of pixels configured to receive light beams passing through a plurality of different partial pupil areas in an imaging optical system, and a processor configured to acquire a defocus amount of the imaging optical system based on a pair of signals from the plurality of pixels and to control the imaging optical system based on the defocus amount. In a case where the imaging optical system is a first lens apparatus having a plurality of optical axes and includes a first optical system and a second optical system arranged in parallel with the first optical system, the processor is configured to control the imaging optical system based on one of a first defocus amount in a first AF area by the first optical system or a second defocus amount in a second AF area by the second optical system, and determine whether to use the first defocus amount or the second defocus amount in controlling the imaging optical system according to information on a first optical axis of the first optical system and information on a second optical axis of the second optical system. A control method of the above image pickup apparatus also constitutes another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DETAILED DESCRIPTION

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the present disclosure.

External Configuration of Camera Body

Figure 1A:
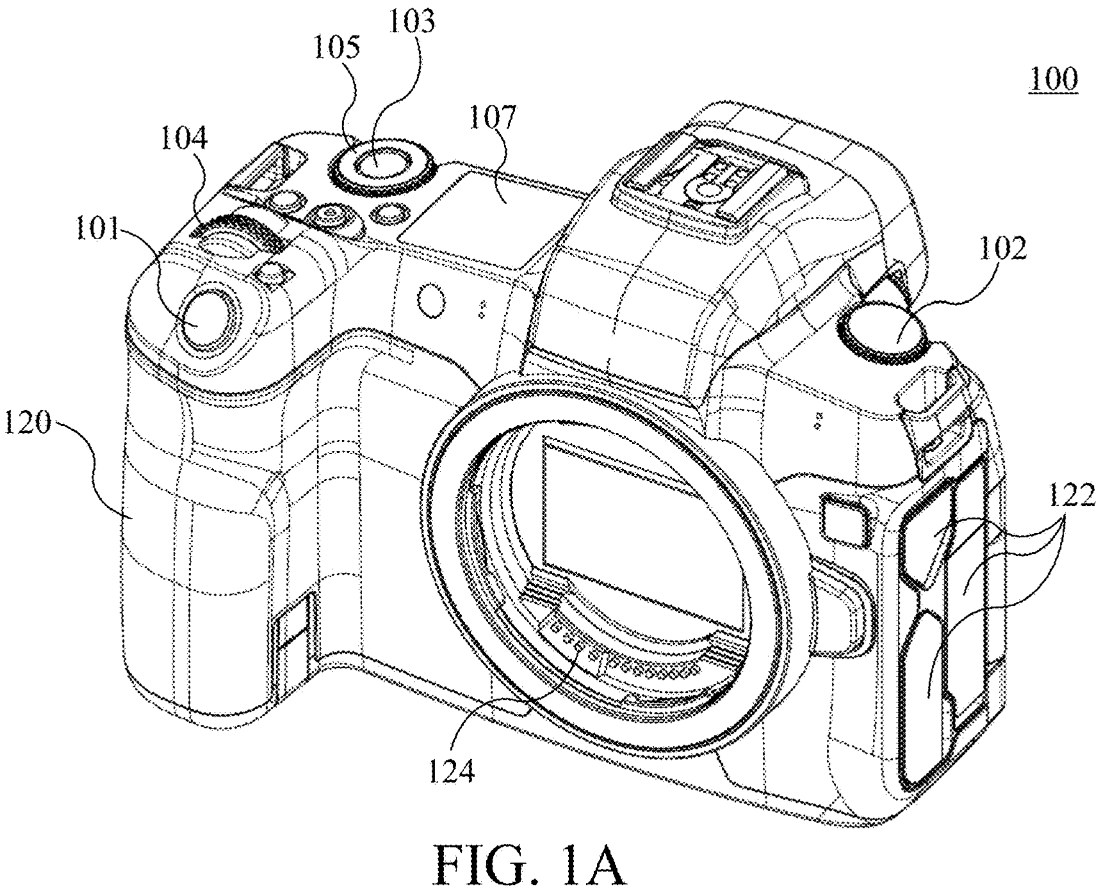
FIGS. 1A and 1B illustrate an example external configuration of an image pickup apparatus according to this embodiment.
Figure 1B:
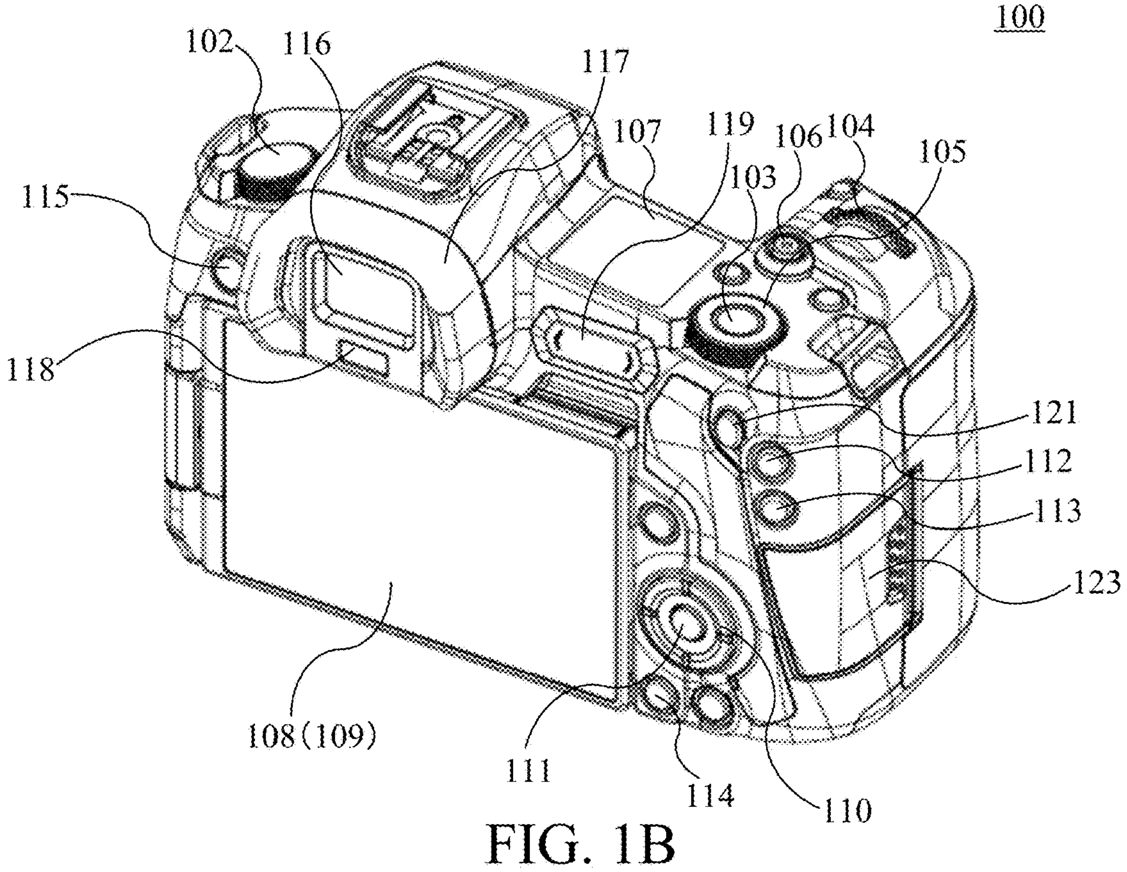

Referring now to FIGS. 1A and 1B, a description will be given of the external configuration of a camera body (digital camera, image pickup apparatus) 100 according to this embodiment. FIGS. 1A and 1B illustrate an example external configuration of the camera body 100. FIG. 1A is a perspective view of the camera body 100 viewed from the front, and FIG. 1B is a perspective view of the camera body 100 viewed from the back.

The camera body 100 includes a shutter button 101, a power switch 102, a mode switch 103, a main electronic dial 104, a sub electronic dial 105, a moving image button 106, and an extra-finder display unit 107 on the top surface. The shutter button 101 is an operation unit for preparing for imaging or issuing an imaging instruction. The power switch 102 is an operation unit for powering on and off the camera body 100. The mode switch 103 is an operation unit for switching between various modes. The main electronic dial 104 is a rotary operation unit for changing settings such as a shutter speed and an F-number (aperture value). The sub electronic dial 105 is a rotary operation unit for moving a selection frame (cursor) and performing image feeding. The moving image button 106 is an operation unit for instructing the start and stop of moving image capturing (recording). The extra-finder display unit 107 displays various settings such as a shutter speed and an F-number (aperture value).

The camera body 100 includes a display unit 108, a touch panel 109, directional keys 110, a setting button 111, an auto-exposure (AE) lock button 112, an enlargement button 113, a playback button 114, a menu button 115, an eyepiece unit 116, an eye proximity detector 118, and a touch bar 119 on the back. The display unit 108 displays images and various information. As described later, the display unit 108 displays information about the first AF area and information about the second AF area. The touch panel 109 is an operation unit that detects touch operations on the display surface (touch operation surface) of the display unit 108. The directional keys 110 are an operation unit consisting of keys (four-way keys) that can be pressed up, down, left, and right. Operations can be performed according to the position where one of the directional keys 110 is pressed. The setting button 111 is an operation unit that is pressed mainly in determining a selected item. The AE lock button 112 is an operation unit that is pressed in fixing an exposure state in an imaging standby state.

The enlargement button 113 is an operation unit for turning on and off the enlargement mode in the live-view (LV) display in the imaging mode. In a case where the enlargement mode is turned on, the live-view (LV) image is enlarged or reduced by operating the main electronic dial 104. The enlargement button 113 is also used in enlarging a playback image or increasing the magnification ratio in the playback mode. The playback button 114 is an operation unit for switching between the imaging mode and the playback mode. In the imaging mode, pressing the playback button 114 switches to the playback mode, and the latest image among the images recorded in the recording medium 228 described later can be displayed on the display unit 108.

The menu button 115 is an operation unit that is pressed in displaying a menu screen on which various settings can be made on the display unit 108. The user can intuitively perform various settings using the menu screen displayed on the display unit 108, the directional keys 110, and the setting button 111. The eyepiece unit 116 is a unit for placing the eye on the eyepiece viewfinder (peep type finder) 117. The user can view an image displayed on an internal electronic viewfinder (EVF) 217 (described later) through the eyepiece unit 116. The eye proximity detector 118 is a sensor that detects whether the user has placed the eye near the eyepiece unit 116.

The touch bar 119 is a line-shaped touch operation unit (line touch sensor) that can accept touch operations. The touch bar 119 is located at a position that can be touched (touched) by the thumb of the right hand in a case where the grip portion 120 is held with the right hand (holding with the little finger, ring finger, and middle finger of the right hand) so that the shutter button 101 can be pressed with the index finger of the right hand. That is, the touch bar 119 can be operated in a state (imaging posture) where the user places his/her eye on the eyepiece unit 116, peeps through the eyepiece finder 117, and is ready to press the shutter button 101 at any time. The touch bar 119 can accept tap operations (touching and then releasing without moving within a predetermined period) and left/right slide operations (touching and then moving the touched position while the user keeps touching), etc. The touch bar 119 is an operation unit different from the touch panel 109, and does not have a display function. The touch bar 119 in this embodiment is a multifunctional bar, and functions, for example, as an M-Fn bar.

The camera body 100 further includes a grip portion 120, a thumb rest portion 121, a terminal cover 122, a lid 123, a communication terminal 124, etc. The grip portion 120 is a holder formed in a shape that is easy to hold with the right hand of the user in a case where he holds the camera body 100. The shutter button 101 and main electronic dial 104 are located at positions operable by the index finger of the right hand in a case where the user holds the camera body 100 by gripping the grip portion 120 with his little finger, ring finger, and middle finger of the right hand. Similarly, the sub electronic dial 105 and touch bar 119 are located at positions operable by the thumb of the right hand.

The thumb rest portion 121 is a grip portion provided on the rear side of the camera body 100 at a position (thumb standby position) where it is easy to place the thumb of the right hand holding the grip portion 120 while none of the operation units are being operated. The thumb rest portion 121 is made of a rubber member or the like to enhance holding power (grip feeling). The terminal cover 122 protects connectors such as a connection cable that connects the camera body 100 to an external device.

The lid 123 protects the recording medium 228 and the slot by closing a slot for storing the recording medium 228 described later. The communication terminal 124 is a terminal for communicating with the lens unit 200 described later, which is attachable to and detachable from the camera body 100.

Internal Configuration of Imaging System

Figure 2:
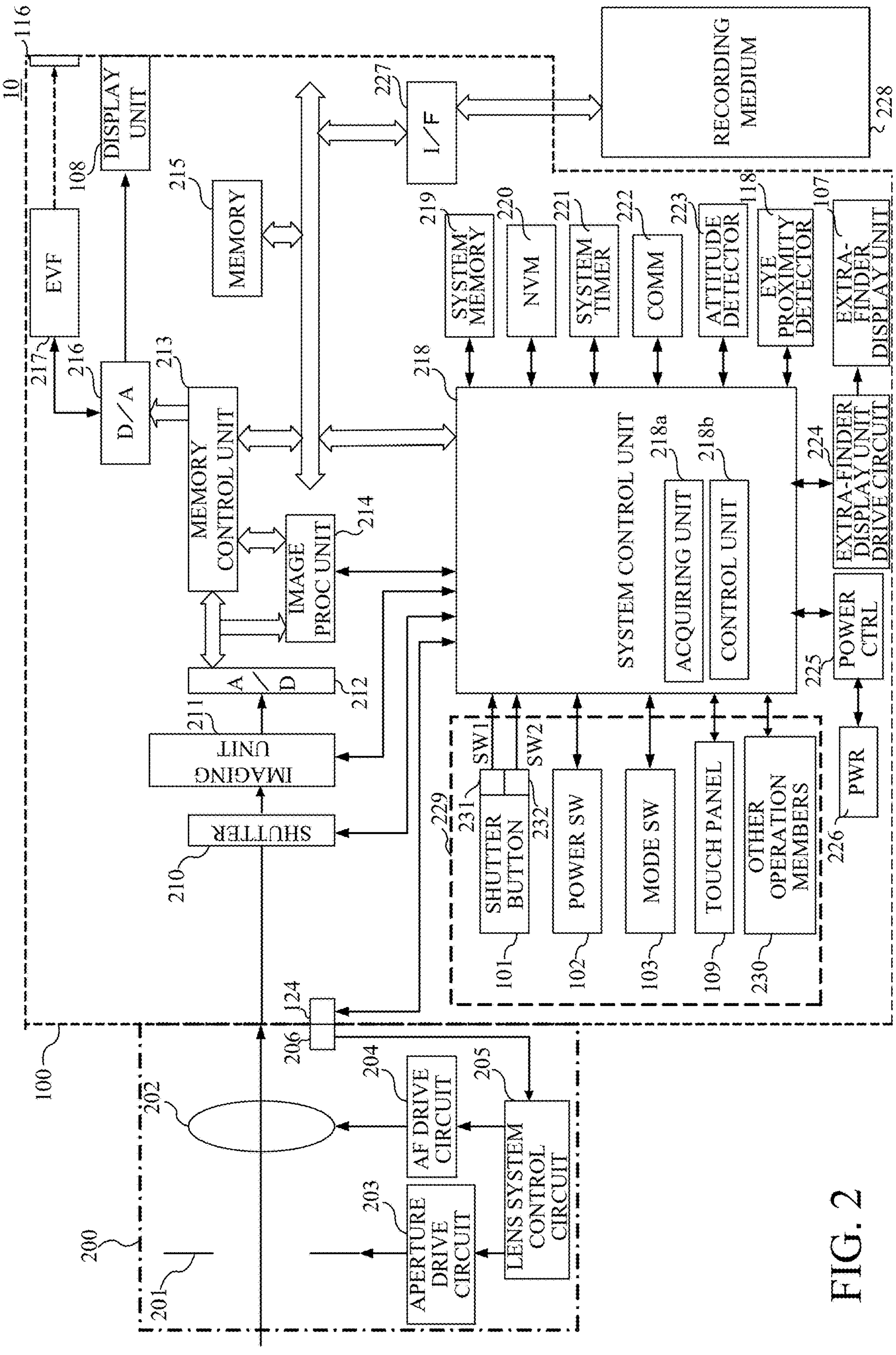
FIG. 2 illustrates an example of the internal configuration of an imaging system according to this embodiment.

Referring now to FIG. 2, a description will be given of the internal configuration of an imaging system 10 according to this embodiment. FIG. 2 illustrates an example internal configuration of the imaging system 10. Those elements in FIG. 2, which are corresponding elements in FIGS. 1A and 1B, will be designated by the same reference numerals, and a description will be omitted. The imaging system 10 includes a camera body 100 and a lens unit (lens apparatus) 200 that is attachable to and detachable from the camera body 100. However, this embodiment is not limited to this example, and can also be applied to an image pickup apparatus in which the camera body and the lens unit are integrated with each other.

The lens unit 200 will now be described. The lens unit 200 is a type of interchangeable lens that is attached to and detached from the camera body 100. The lens unit 200 is a single-lens lens, and is an example of a normal lens. The lens unit 200 has an aperture stop (diaphragm) 201, a lens 202, an aperture drive circuit 203, an AF drive circuit 204, a lens system control circuit 205, and a communication terminal 206.

The aperture stop 201 is configured so that the aperture diameter can be adjusted. The lens 202 includes a plurality of lenses. The aperture drive circuit 203 adjusts a light amount by controlling the aperture diameter of the aperture stop 201. The AF drive circuit 204 drives the lens 202 for focusing. The lens system control circuit 205 controls the aperture drive circuit 203, the AF drive circuit 204, etc., based on instructions from a system control unit 218, which will be described later. The lens system control circuit 205 controls the aperture stop 201 via the aperture drive circuit 203, and performs focusing by changing the position of the lens 202 via the AF drive circuit 204. The lens system control circuit 205 can communicate with the camera body 100. More specifically, communication is performed via a communication terminal 206 of the lens unit 200 and a communication terminal 124 of the camera body 100. The communication terminal 206 is a terminal through which the lens unit 200 communicates with the camera body 100.

The camera body 100 will now be described. The camera body 100 includes a shutter 210, an imaging unit 211, an A/D converter 212, a memory control unit 213, an image processing unit 214, a memory 215, a D/A converter 216, an EVF 217, a display unit 108, and the system control unit 218.

The shutter 210 is a focal plane shutter that can freely control the exposure time of the imaging unit 211 based on instructions from the system control unit 218. The imaging unit 211 has an image sensor that converts an optical image into an electrical signal. The image sensor is a photoelectric conversion element such as a Charge Coupled Device (CCD) sensor or a Complementary Metal-Oxide-Semiconductor (CMOS) sensor. The imaging unit 211 may have an imaging-surface phase-difference sensor that outputs defocus amount information to the system control unit 218.

The A/D converter 212 converts the analog signal output from the imaging unit 211 into a digital signal. The image processing unit 214 performs predetermined processing (pixel interpolation, resizing such as reduction, color conversion, etc.) for the data from the A/D converter 212 or the data from the memory control unit 213. The image processing unit 214 also performs predetermined calculation processing using the captured image data, and the system control unit 218 performs exposure control and focus detecting control based on the obtained calculation result. This processing allows through-the-lens (TTL) AF processing, AE processing, flash pre-flash (EF) processing, etc. to be performed. The image processing unit 214 also performs predetermined calculation processing using the captured image data, and TTL auto-white balance (AWB) processing based on the obtained calculation result.

The image data from the A/D converter 212 is written into the memory 215 via the image processing unit 214 and the memory control unit 213. Alternatively, image data from the A/D converter 212 is written to the memory 215 via the memory control unit 213 without passing through the image processing unit 214. The memory 215 stores image data obtained by the imaging unit 211 and converted into digital data by the A/D converter 212, and image data to be displayed on the display unit 108 and EVF 217. The memory 215 has a storage capacity sufficient to store a predetermined number of still images and a predetermined period of moving images and audio. The memory 215 also serves as an image display memory (video memory).

The D/A converter 216 converts image display data stored in the memory 215 into an analog signal and supplies it to the display unit 108 and EVF 217. Therefore, the display image data written into the memory 215 is displayed on the display unit 108 and EVF 217 via the D/A converter 216. The display unit 108 and EVF 217 perform display according to the analog signal from the D/A converter 216. The display unit 108 and the EVF 217 are, for example, display devices such as an LCD or an organic EL. A digital signal that has been A/D-converted by the A/D converter 212 and stored in the memory 215 is converted into an analog signal by the D/A converter 216, and the analog signal is sequentially transferred to and displayed on the display unit 108 and the EVF 217. Thereby, live-view display is achieved.

The system control unit 218 is a control unit that includes at least one processor and/or at least one circuit. That is, the system control unit 218 may be a processor, a circuit, or a combination of a processor and a circuit. The system control unit 218 controls the entire camera body 100. The system control unit 218 executes a program recorded in the nonvolatile memory 220 to realize each processing in the flowcharts described below. The system control unit 218 also performs display control by controlling the memory 215, the D/A converter 216, the display unit 108, the EVF 217, and the like.

In this embodiment, the system control unit 218 includes an acquiring unit **218*a* and a control unit 218*b*. The acquiring unit 218*a* acquires a defocus amount as a focus detection result of the imaging optical system of the lens unit 300 based on a pair of signals (focus detecting signals) from a plurality of pixels (focus detecting pixels) on the image sensor in the imaging unit 211. The control unit 218*b* controls the imaging optical system based on the defocus amount acquired by the acquiring unit 218*a***.

As described below, the control unit **218*b* controls the imaging optical system (first optical system and second optical system) based on either a first defocus amount in the first AF area by the first optical system or a second defocus amount in the second AF area by the second optical system. The control unit 218*b* determines whether to use the first defocus amount or the second defocus amount in controlling the imaging optical system, according to information about the first optical axis OA1 of the first optical system and information about the second optical axis OA2 of the second optical system. In other words, the control unit 218*b*** determines whether to use the first defocus amount or the second defocus amount according to the positions of the first AF area and the second AF area.

The camera body 100 further includes a system memory 219, a nonvolatile memory 220, a system timer 221, a communication unit 222, an attitude detector 223, and an eye proximity detector 118.

The system memory 219 has, for example, a Random Access Memory (RAM). Constants and variables for the operation of the system control unit 218, and programs read from the nonvolatile memory 220 are loaded in the system memory 219. The nonvolatile memory 220 is an electrically erasable and recordable memory, and can use, for example, an EEPROM. The nonvolatile memory 220 records constants, programs, etc. for the operation of the system control unit 218. The programs here are programs for executing the flowcharts described later. The system timer 221 is a timekeeping unit that measures the time used for various controls and the time of a built-in clock.

The communication unit 222 transmits and receives video signals and audio signals to and from external devices connected wirelessly or via a wired cable. The communication unit 222 can also connect to a wireless Local Area Network (LAN) or the Internet. The communication unit 222 can also communicate with external devices via Bluetooth (registered trademark) or Bluetooth Low Energy. The communication unit 222 can transmit images (including live-view images) captured by the imaging unit 211 and images recorded on the recording medium 228, and can receive image data and various other information from external devices.

The attitude detector 223 detects the attitude (or orientation) of the camera body 100 relative to the gravity direction. Based on the attitude detected by the attitude detector 223, it is possible to determine whether the image captured by the imaging unit 211 was captured with the camera body 100 held horizontally or vertically. The system control unit 218 can add attitude information corresponding to the attitude detected by the attitude detector 223 to an image file of the image captured by the imaging unit 211, or rotate and record the image. The attitude detector 223 can use, for example, an acceleration sensor or a gyro sensor. It is also possible to use the attitude detector 223 to detect the movement of the camera body 100 (panning, tilting, lifting, whether it is stationary, etc.).

The eye proximity detector 118 can detect the proximity of an object to the eyepiece unit 116 of the eyepiece finder 117 incorporating the EVF 217. The eye proximity detector 118 can use, for example, an infrared proximity sensor. In a case where an object approaches, infrared rays projected from the light projector in the eye proximity detector 118 are reflected by the object and received by the light receiver in the infrared proximity sensor. A distance from the eyepiece unit 116 to the object can be determined based on the amount of infrared light received. Thus, the eye proximity detector 118 performs eye proximity detection to detect the proximity of an object to the eyepiece unit 116.

The eye proximity detector 118 is an eyepiece detecting sensor that detects the approach (eye proximity) and departure (eye separation) of the eye (object) to the eyepiece unit 116 of the eyepiece finder 117. In a case where an object is detected as approaching within a predetermined distance from the non-eye-proximity state (non-approaching state), the eye proximity detector 118 detects that the eye has been placed near the object. In a case where an object that is detected as departing from the eye proximity state (approaching state) by more than a predetermined distance, the eye proximity detector 118 detects that the eye has been separated. The threshold for detecting the eye proximity and the threshold for detecting the eye separation may be different, for example, by providing a hysteresis. After the eye proximity is detected, the eye proximity state remains until the eye separation is detected. After the eye separation is detected, the eye separation remains until the eye proximity is detected.

The system control unit 218 switches between display state and non-display state of each of the display unit 108 and the EVF 217 according to the state detected by the eye proximity detector 118. More specifically, in a case where the camera is at least in an imaging standby state and the display destination switching setting is automatic switching, the display destination is set to the display unit 108 and the display is turned on while the EVF 217 is turned off. During the eye proximity, the display destination is set to the EVF 217 and the display is turned on while the display unit 108 is turned off. The eye proximity detector 118 is not limited to an infrared proximity sensor, and another sensor may be used as long as it can detect a state that can be regarded as an eye proximity state.

The camera body 100 also has an extra-finder display unit 107, an extra-finder display drive circuit 224, a power control unit 225, a power supply unit 226, a recording medium interface (I/F) 227, and an operation unit 229.

The extra-finder display unit 107 displays various settings of the camera body 100, such as a shutter speed and an F-number (aperture value), via the extra-finder display drive circuit 224. The power control unit 225 includes a battery detection circuit, a DC-DC converter, a switch circuit for switching between blocks to be electrified, and the like, and detects whether a battery is attached, the type of battery, and the remaining battery level. The power control unit 225 also controls the DC-DC converter based on the detection results and instructions from the system control unit 218, and supplies the necessary voltage for the necessary period to each unit, including the recording medium 228. The power supply unit 226 is a primary battery such as an alkaline battery or a lithium battery, a secondary battery such as a NiCd battery, a NiMH battery, or a Li battery, an AC adapter, etc. The recording medium I/F 227 is an interface with the recording medium 228, such as a memory card or a hard disk drive. The recording medium 228 is a memory card or the like for recording captured images, and includes a semiconductor memory, a magnetic disk, etc. The recording medium 228 may be removable or may be built in.

The operation unit 229 is an input unit that accepts operations from the user (user operations) and is used to input various instructions to the system control unit 218. The operation unit 229 includes the shutter button 101, the power switch 102, the mode switch 103, the touch panel 109, other operation units 230, etc. The other operation units 230 include the main electronic dial 104, the sub electronic dial 105, the moving image button 106, the directional keys 110, the setting button 111, the AE lock button 112, the enlargement button 113, the playback button 114, the menu button 115, the touch bar 119, etc.

The shutter button 101 has a first shutter switch 231 and a second shutter switch 232. The first shutter switch 231 is turned on in a case where the shutter button 101 is being operated or so-called half-pressed (an imaging preparation instruction), and generates a first shutter switch signal SW1. The system control unit 218 starts imaging preparation processing, such as AF processing, AE processing, AWB processing, and EF processing, in response to the first shutter switch signal SW1. The second shutter switch 232 is turned on in a case where the shutter button 101 is completely operated or fully pressed (imaging instruction), and generates a second shutter switch signal SW2. In response to the second shutter switch signal SW2, the system control unit 218 starts a series of imaging processing, from reading out a signal from the imaging unit 211 to generating an image file including a captured image and writing the image file into the recording medium 228.

The mode switch 103 changes the operation mode of the system control unit 218 to one of a still image capturing mode, a moving image capturing mode, a playback mode, and the like. Modes included in the still image capturing mode include an automatic imaging mode, an automatic scene determining mode, a manual mode, an aperture priority mode (Av mode), a shutter speed priority mode (Tv mode), and a program AE mode (P mode). There are various scene modes and custom modes that are imaging settings for each imaging scene. The user can directly switch to one of the above imaging modes using the mode switch 103. Alternatively, the user can selectively switch to one of the displayed modes using the operation unit 229 after switching to a list screen of imaging modes using the mode switch 103. Similarly, the moving image capturing mode may include a plurality of modes.

The touch panel 109 is a touch sensor that detects various touch operations on the display surface of the display unit

108 (the operation surface of the touch panel 109). The touch panel 109 and the display unit 108 can be integrated. For example, the touch panel 109 is attached to the upper layer of the display surface of the display unit 108 so that the light transmittance does not interfere with the display of the display unit 108. Associating input coordinates on the touch panel 109 with display coordinates on the display surface of the display unit 108 can form a Graphical User Interface (GUI) that enables the user to directly operate the screen displayed on the display unit 108. The touch panel 109 can use any of various methods such as a resistive film method, a capacitive method, a surface acoustic wave method, an infrared method, an electromagnetic induction method, an image recognition method, and an optical sensor method. According to the method, there is a method that detects a touch by contact with the touch panel 109, and a method that detects a touch by the approach of a finger or a pen to the touch panel 109, but any method may be used.

The system control unit 218 can detect the following operations or states on the touch panel 109. It is compatible with commonly known functions and responds as a camera system according to the state of the touch panel operation.

Lens Unit Configuration

Figure 3:
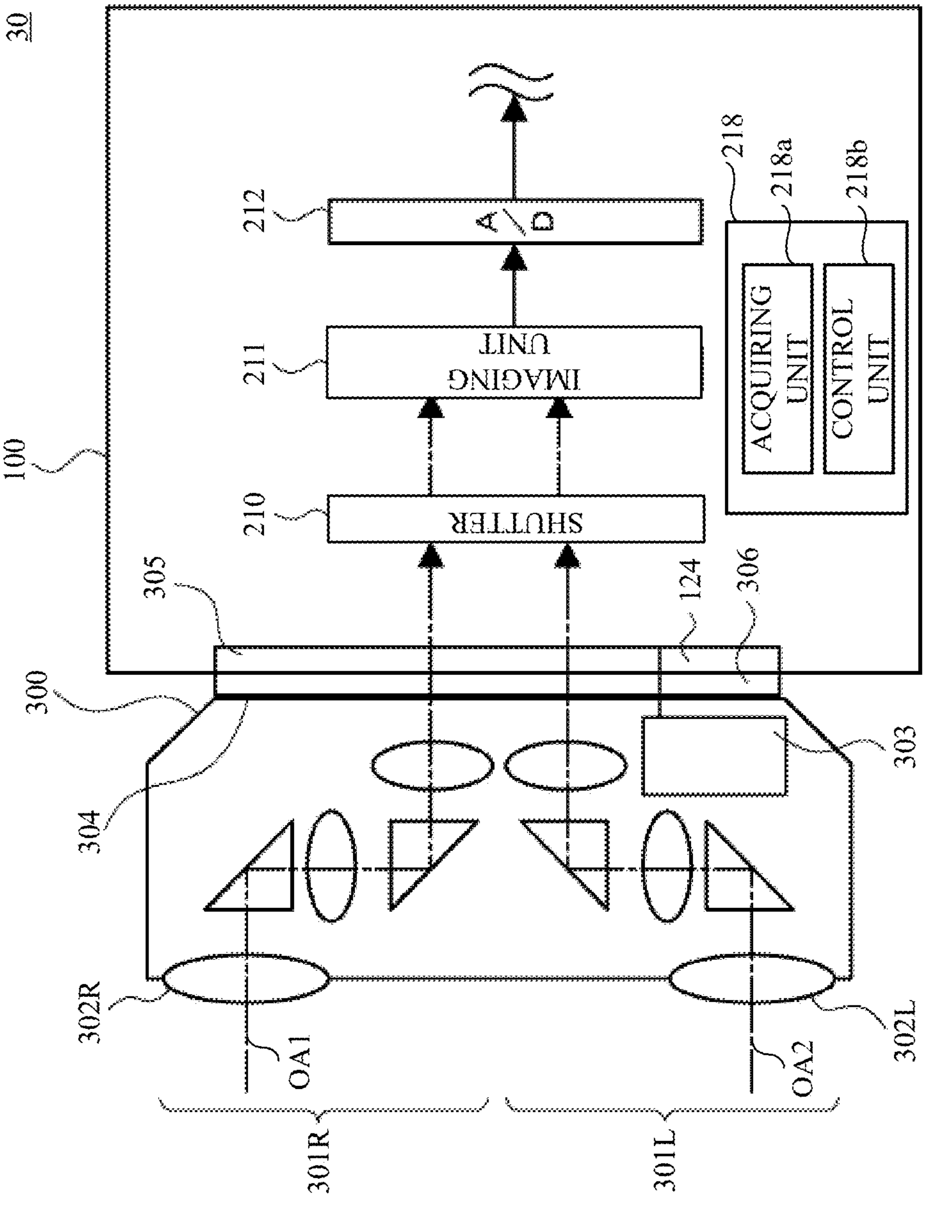
FIG. 3 illustrates an example of the configuration of the imaging system according to this embodiment.

Referring now to FIG. 3, a description will be given of an imaging system 30 according to this embodiment. FIG. 3 illustrates an example configuration of the imaging system 30 according to this embodiment. FIG. 3 illustrates the imaging system 30 in which a lens unit 300 is attached to the camera body 100. Those elements in the camera body 100 illustrated in FIG. 3, which are corresponding elements in FIG. 2, will be designated by the same reference numerals, and a description thereof will be omitted.

The imaging system 30 includes the camera body 100 and the lens unit (lens apparatus) 300 that can be attached to the camera body 100. The lens unit 300 is a type of interchangeable lens attachable to and detachable from the camera body 100, and is, for example, a VR lens. The lens unit 300 is a twin lens that can capture images with parallax between left and right images. The lens unit 300 includes two optical systems, each with a wide viewing angle of approximately 180 degrees, and can capture a range of the front hemisphere. More specifically, the two optical systems of the lens unit 300 can capture an object with a field (angle of view) of 180 degrees in the left-right direction (horizontal angle, azimuth angle, yaw angle) and 180 degrees in the up-down direction (vertical angle, elevation angle, pitch angle).

The lens unit 300 has a right-eye optical system 301R having a plurality of lenses and mirrors, a left-eye optical system 301L having a plurality of lenses and mirrors, and a lens system control circuit 303. The right-eye optical system 301R is an example of a first optical system, and the left-eye optical system 301L is an example of a second optical system arranged in parallel with the first optical system. The right-eye optical system 301R and the left-eye optical system 301L constitute the imaging optical system of the lens unit 300. The right-eye optical system 301R has a first optical axis OA1, and the left-eye optical system 301L has a second optical axis OA2. In the description of this embodiment, the left-eye optical system 301L may be the first optical system, and the right-eye optical system 301R may be the second optical system. The right-eye optical system 301R and the left-eye optical system 301L have lenses 302R and 302L located on the object side facing the same direction, and the first optical axis OA1 and the second optical axis OA2 are approximately parallel to each other. In this embodiment, the imaging optical system of the lens unit 300 is not limited to a configuration having only two optical systems, and may have three or more optical systems.

The lens unit 300 according to this embodiment is a VR180 lens for capturing images for so-called VR180, which is a virtual reality (VR) image format that allows binocular stereoscopic vision. The VR180 lens has fisheye lenses that allow the right-eye optical system 301R and the left-eye optical system 301L to capture a range of approximately 180 degrees. The VR180 lens may be a lens capable of capturing a wide viewing angle range of about 160 degrees, narrower than the 180-degree range, as long as the right-eye optical system 301R and the left-eye optical system 301L can obtain images that can be displayed as a binocular VR display as VR180. The VR180 lens can form a right image (first image) formed through the right-eye optical system 301R and a left image (second image) formed through the left-eye optical system 301L, which has a parallax from the right image, on one or two image sensors in the attached camera body.

The lens unit 300 includes a focus ring for focusing. Although not illustrated, the lens unit 300 includes two focus rings: one for focusing the right image formed through the right-eye optical system 301R, and the other for focusing the left image formed through the left-eye optical system 301L. Alternatively, the lens unit 300 includes two focus rings: one for focusing the right image and the left image simultaneously, and the other for focusing either the right image or the left image.

The lens unit 300 is attached to the camera body 100 via a lens mount unit 304 and a camera mount unit 305 of the camera body 100. By attaching the lens unit 300 to the camera body 100, the system control unit 218 and the lens system control circuit 303 are electrically connected via the communication terminal 124 of the camera body 100 and a communication terminal 306 of the lens unit 300.

In this embodiment, a right image formed via the right-eye optical system 301R and a left image formed via the left-eye optical system 301L having parallax from the right image are imaged side by side on the imaging unit 211 in the camera body 100. In other words, two optical images formed by the right-eye optical system 301R and the left-eye optical system 301L are formed on a single image sensor. The imaging unit 211 converts the captured object images (optical signals) into analog electrical signals. Thus, by using the lens unit 300, two (a set of) images with parallax can be simultaneously acquired from two locations (optical systems), the right-eye optical system 301R and the left-eye optical system 301L. By dividing the acquired images into a left-eye image and a right-eye image and displaying them in VR, the user can view a stereoscopic VR image in a range of approximately 180 degrees, so-called VR180.

In this embodiment, the lens system control circuit 303 controls the driving of the right-eye optical system 301R and the left-eye optical system 301L based on a command from the system control unit 218 in the camera body 100.

Configuration of Image Sensor

Figure 4:
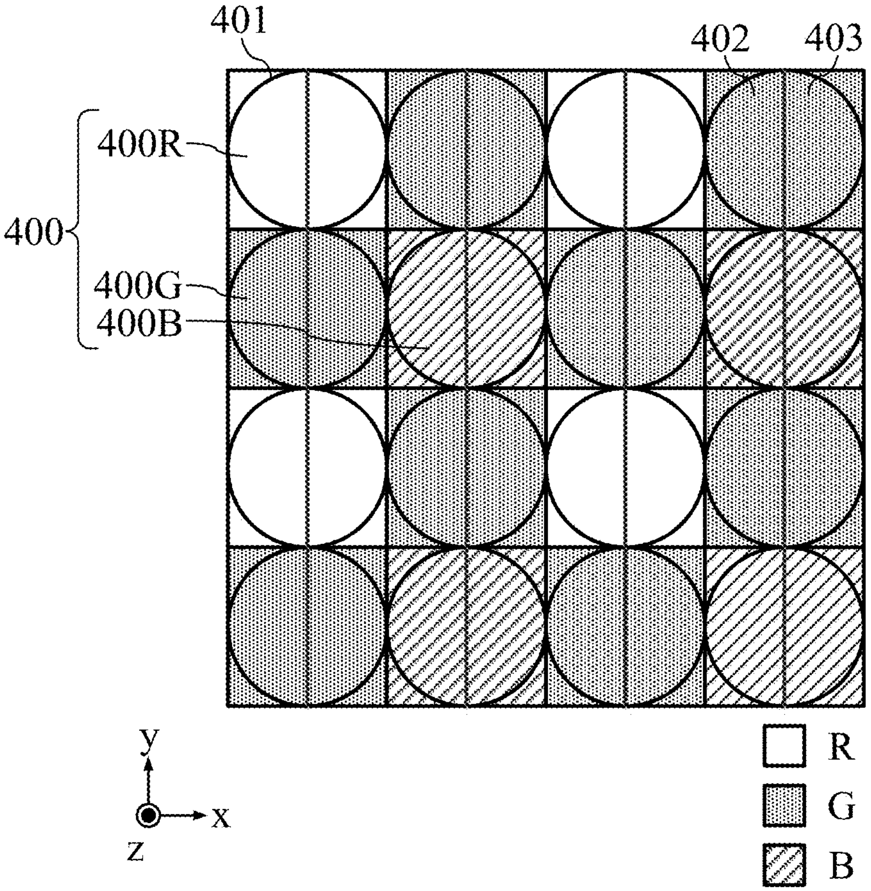
FIG. 4 illustrates an example of a pixel array according to this embodiment.

Referring now to FIG. 4, a description will be given of the pixel array of the image sensor in the imaging unit 211 according to this embodiment. FIG. 4 illustrates an example pixel array of the image sensor. FIG. 4 illustrates the pixel array of a two-dimensional CMOS sensor that is used as the image sensor in a range of 4 columns×4 rows of imaging pixels (8 columns×4 rows as the focus detecting pixel array).

In this embodiment, a pixel group 400 includes pixels arranged in 2 columns×2 rows, and is covered with color filters in a Bayer array. In the pixel group 400, a pixel 400R having a spectral sensitivity of R (red) is disposed at the upper left position, a pixel 400G having a spectral sensitivity of G (green) is disposed at the upper right and lower left positions, and a pixel 400B having a spectral sensitivity of B (blue) is disposed at the lower right position. In the image sensor in the imaging unit 211 according to this embodiment, each pixel has a plurality of photodiodes (photoelectric converters) for one microlens 401 in order to perform focus detection using the imaging-surface phase-difference method. In this embodiment, each pixel includes two photodiodes 402 and 403 arranged in 2 columns×1 row.

As illustrated in FIG. 4, the image sensor in the imaging unit 211 can acquire imaging signals and focusing signals by arranging a large number of pixel groups 400 consisting of pixels arranged in 2 columns×2 rows (photodiodes arranged in 4 columns×2 rows) on the imaging surface.

In each pixel having such a configuration, a light beam is separated by the microlens 401 and imaged on the first photodiode 402 and the second photodiode 403. Then, a signal (A+B signal) obtained by adding the signals from the two photodiodes 402 and 403 is used as an image signal, and a pair of focus signals (A and B image signals) read out from each of the photodiodes 402 and 403 are used as a focus signal. The image signal and the focus signal may be read out separately, but the following configuration may be employed based on the processing load. That is, the image signal (A+B signal) and the focus signal (e.g., A signal) of one of the photodiodes 402 and 403 may be read out and a difference may be calculated to obtain the focus signal (e.g., B signal) of the other.

In this embodiment, each pixel has two photodiodes 402 and 403 for the single microlens 401, but the number of photodiodes is not limited to two and may be more than two. A plurality of pixels having different opening positions of the light receivers for the microlens 401 may be provided. In other words, it is sufficient that the configuration can acquire two signals for phase-difference detection, such as the A image signal and the B image signal, which can detect a phase difference.

While FIG. 4 illustrates a configuration in which all pixels have a plurality of photodiodes, this embodiment is not limited to this example. For example, a configuration in which focus detecting pixels illustrated in FIG. 4 are discretely provided in a normal pixel area (imaging pixel area) that constitutes the image sensor in the imaging unit 211 may be used.

Relationship Between Defocus Amount and Image Shift Amount

Figure 8A:
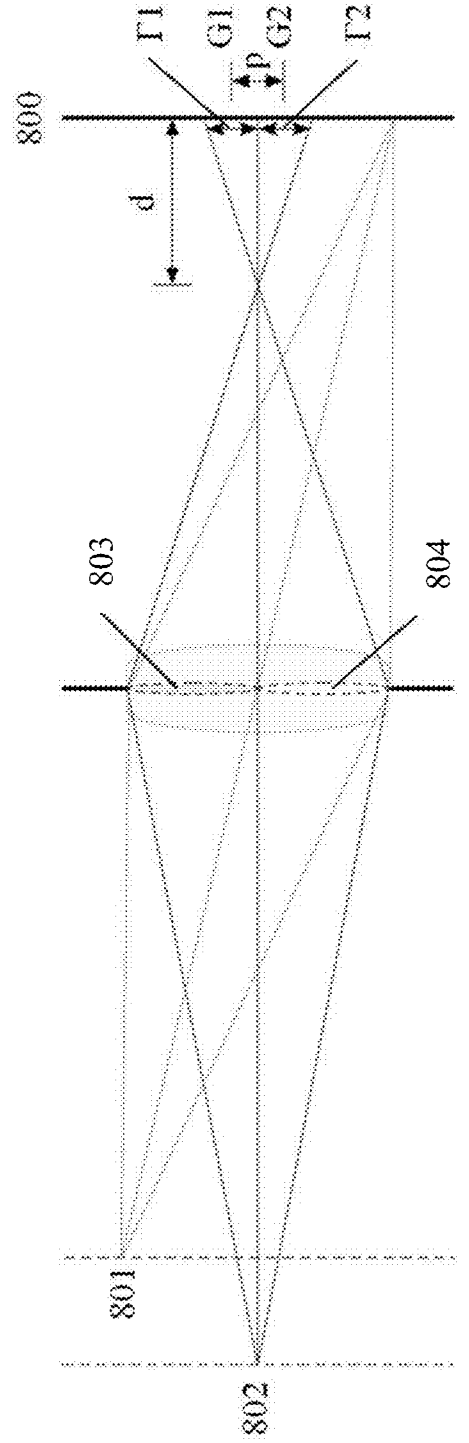
FIGS. 8A, 8B, and 8C illustrate a relationship between a defocus amount and an image shift amount according to this embodiment.
Figure 8B:
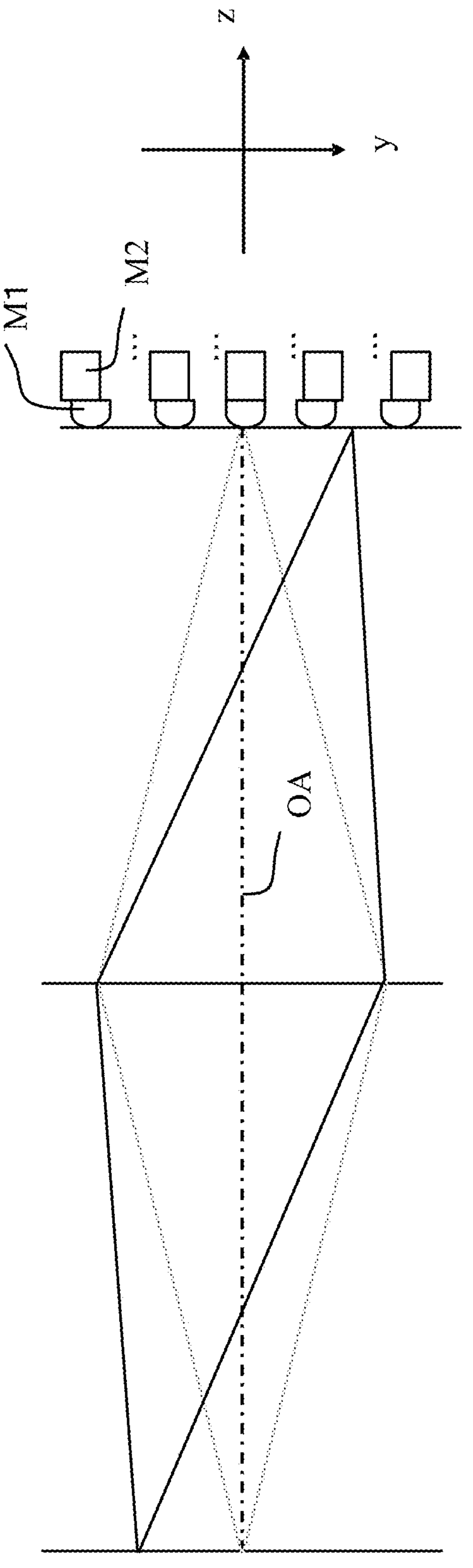
Figure 8C:
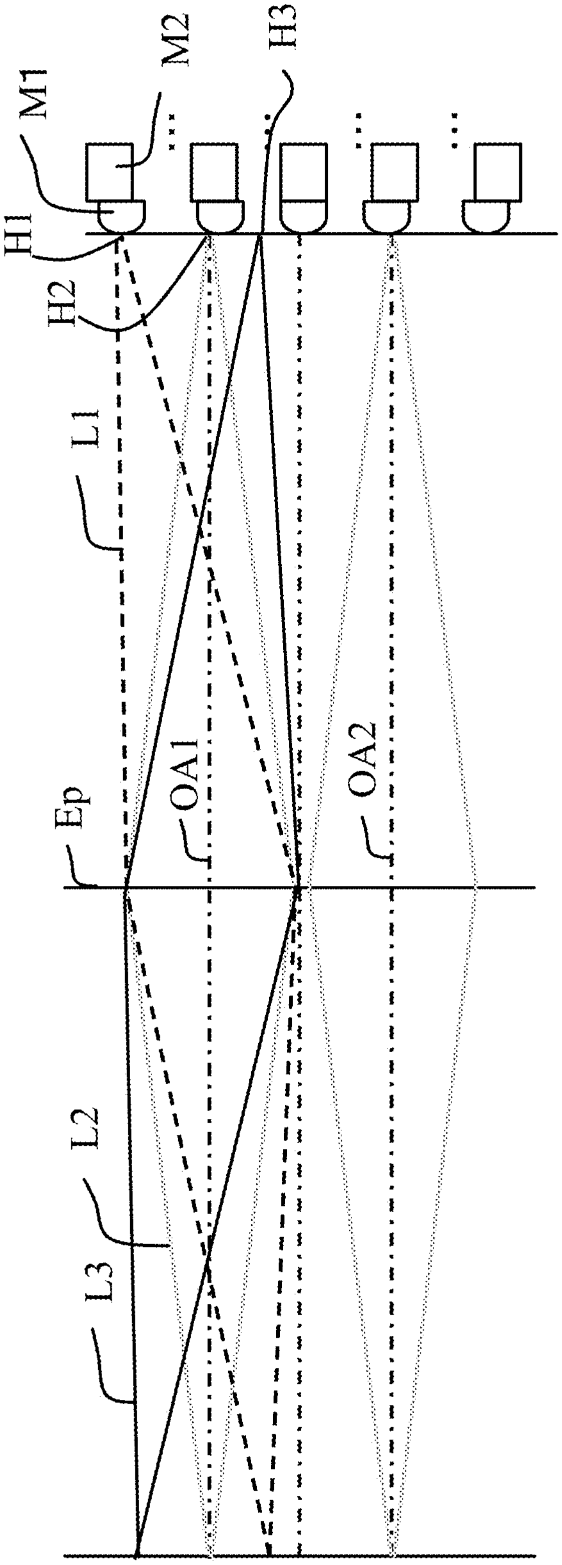

Referring now to FIGS. 8A to 8C, a description will be given of relationship between a defocus amount and an image shift amount calculated from a pair of signals (A image signal and B image signal) acquired by the image sensor in this embodiment. FIGS. 8A to 8C illustrates the relationship between the defocus amount and the image shift amount between a pair of focus detecting signals (A image signal and B image signal).

Referring now to FIG. 8A, a description will be given of a general optical system in which the imaging center and the optical axis center coincide with each other. The image sensor (not illustrated) in this embodiment is placed on an imaging surface 800, and the exit pupil of the imaging optical system is divided into two areas, a first partial pupil area 803 and a second partial pupil area 804.

A defocus amount d is defined as a distance from the imaging position of the object to the imaging plane, with a magnitude |d|. A front focus state has a negative sign (d<0) in which the imaging position of the object is located on the object side of the imaging plane, and a rear focus state has a positive sign (d>0) in which the imaging position is located on the opposite side to the object with respect to the imaging plane. An in-focus state in which the imaging position of the object is located on the imaging plane (focus position) is d=0. In FIG. 8, an object 801 is in focus, and object 802 is in the front focus state. The front focus state (d<0) and rear focus state (d>0) will be collectively referred to as defocus state (|d|>0).

In the front focus state (d<0), the light beam from the object 802 that passes through the first partial pupil area 803 (second partial pupil area 804) is once condensed, then spreads to a width Γ1 (Γ2) around the center of gravity G1 (G2) of the light beam, forming a blurred image on the imaging surface 800. The blurred image is received by the first photodiode 402 (second photodiode 403) that constitutes each pixel disposed on the image sensor, and a pair of focus detecting signals (A and B image signals) are generated. Thus, the pair of focus detecting signals (A and B image signals) are recorded at the center of gravity G1 (G2) on the imaging surface 1300 as an object image of an object 1302 blurred to a width Γ1 (Γ2). The blur width Γ1 (Γ2) of the object image increases approximately in proportion to the increase in the magnitude of the defocus amount d, |d|.

Similarly, the magnitude |p| of an image shift amount p (=difference G1−G2 between the center of gravity positions of the light beams) of the object image between the first focus detecting signal and the second focus detecting signal increases approximately in proportion to the magnitude |d| of the defocus amount d. This is similarly applied to the rear focus state (d>0), although the focus shift direction of the object image between a pair of focus detecting signals is opposite to that in the front focus state.

Previously determining a conversion coefficient K for converting the image shift amount p to the defocus amount d enables the defocus amount d to be calculated from the image shift amount p of the object image between a pair of focus detecting signals.

As illustrated in FIG. 8B, the imaging surface 800 includes a plurality of pixels. Each pixel includes a microlens M1 and a photodiode M2, which are on-chip lenses, and the axis of the microlens and the axis of the photodiode of an image sensor on a general lens optical axis OA coincide with each other. However, at positions on the image sensor surface away from the lens optical axis OA, the microlenses are configured (shrunk) so that a shift amount toward the optical axis increases as a distance from the optical axis increases so as to improve the light condensing efficiency even when a light beam such as that illustrated by the solid line is received.

FIG. 8C illustrates a schematic diagram of light beams in a case where a VR lens is attached as the lens unit 300. As illustrated in FIG. 8C, in the case of the VR lens, there are a plurality of optical axes OA1 and OA2 at positions where the lens optical axes shift from the general optical axis OA in FIG. 8B. FIG. 8C illustrates a light beam that is condensed at an image height H1 by a broken line L1, a light beam that is condensed at an image height H2 (the optical axis center of the VR lens) by a dotted line L2, and a light beam that is condensed at an image height H3 by a solid line L3. In general, the light condensing efficiency is improved by shrinking the microlenses on the imaging surface as described above. However, as the position separates from the center position on the image sensor surface (imaging area) (as the image height increases) (H1>H2>H3), the light condensing efficiency lowers depending on the pupil distance of the lens or the imaging F-number, the symmetry of the pair of signals (A and B image signals) is likely to be lost, and the AF performance may deteriorate.

On the other hand, in the VR lens, at the image height H1, the light beam indicated by the broken line L1 is incident from the shrink direction of the microlens, and thus the light condensing efficiency can be expected to be good, and the AF performance can be as high as that of a normal lens. On the other hand, at the image height H3, the light beam illustrated by the solid line L3 is received from the opposite direction to the shrink direction of the microlens, so the performance deteriorates. Therefore, in the VR lens, a relationship is not maintained in which as the image height becomes higher (H1>H2>H3), the performance deteriorates. In the case of an optical configuration in which as the pupil plane Ep of the lens is closer (to the image sensor surface) or longer (closer to the object), the light incidence angle of the high image height increases, so the performance is likely to deteriorate.

Displayed Image

Figure 5A:
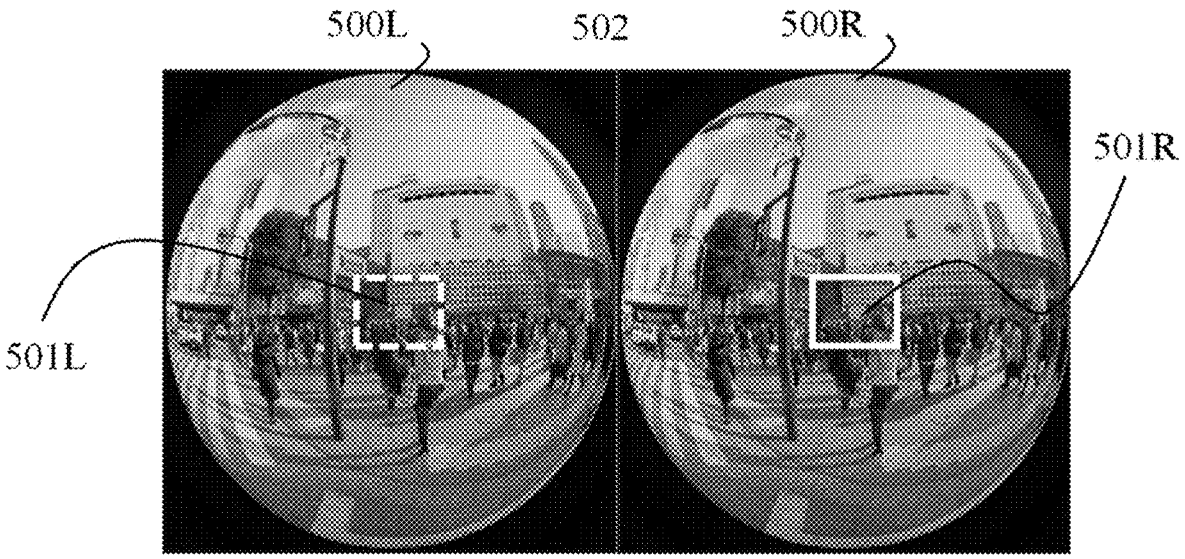
FIGS. 5A and 5B illustrate an example of displayed images in this embodiment.
Figure 5B:
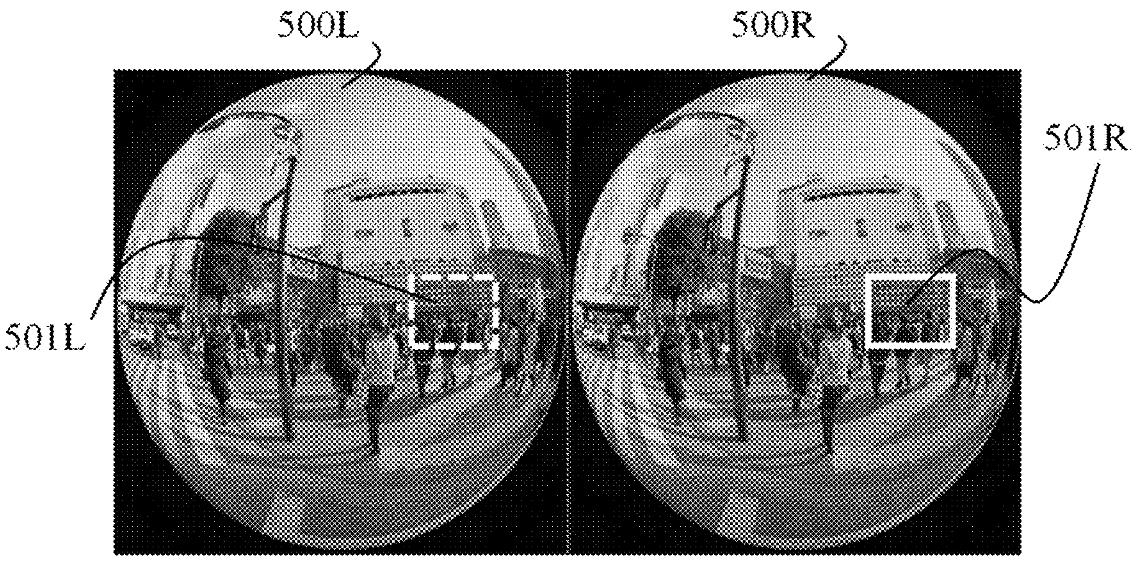

Referring now to FIGS. 5A and 5B, a description will be given of an example image (display image) displayed on the display unit 108 in this embodiment. FIGS. 5A and 5B illustrate an example display image in this embodiment.

This embodiment assumes that the lens unit has optical systems with two optical axes, left and right, to provide stereoscopic vision. Therefore, two images (displayed images) of the left image (500L) and the right image (500R) of the display image 502 are displayed on the display unit 108. The display image 502 includes an AF area 501R displayed based on the right image, and an AF area 501L in the left image that corresponds to the AF area 501R. The AF frame indicates the outer shape of the AF area, and the center coordinate of the focus detecting frame is the image height.

FIG. 5A illustrates an AF frame setting example at a central image height of each optical axis, and FIG. 5B illustrates an AF frame setting example at a right image height. Even when the frame is set at a position other than the central image height, an AF frame may be placed at an object detecting position, or two AF frames may be set by making equivalent the shift amount on the image sensor from each optical axis position.

Although FIGS. 5A and 5B illustrate AF frame display examples corresponding to the two images, the left image (500L) and the right image (500R), this embodiment is not limited to this example. For example, only one frame may be displayed as a user interface, or a plurality of frames may be displayed in different formats, such as a solid line and a dotted line as illustrated in FIGS. 5A and 5B. In other words, the display unit 108 may display information regarding the first AF area and information regarding the second AF area in different formats.

AF Operation

Figure 6:
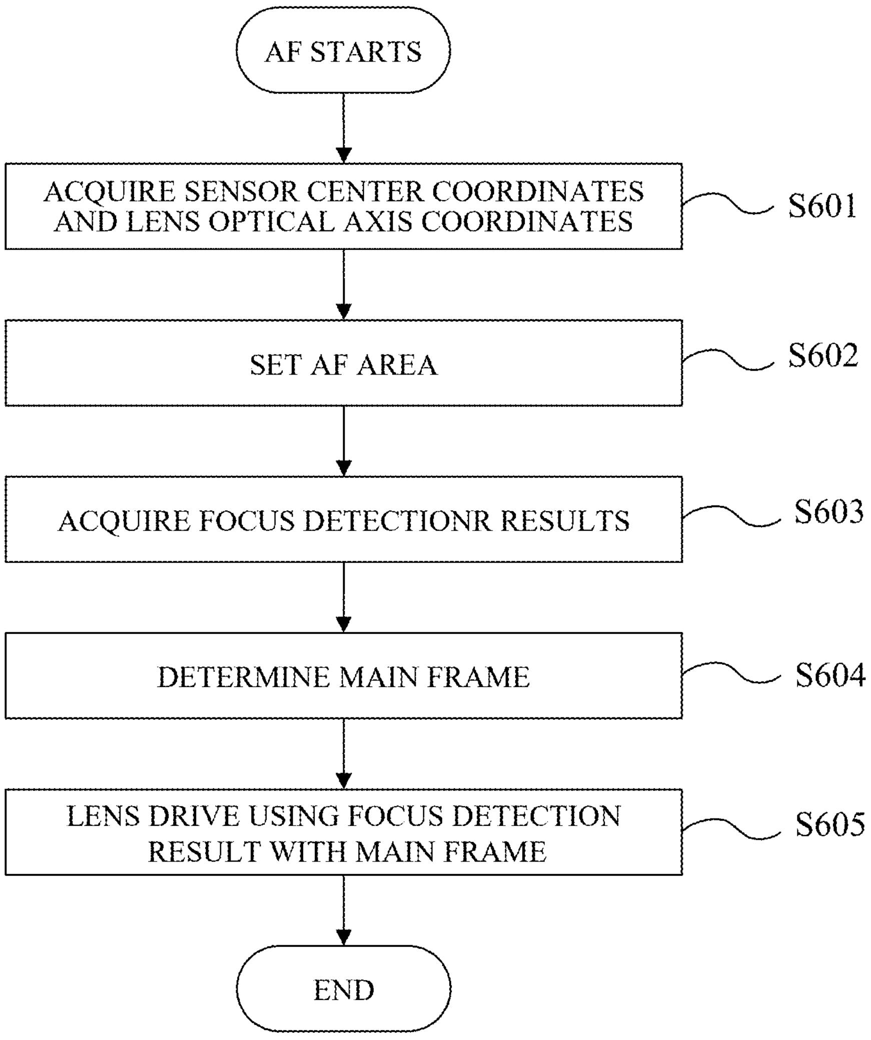
FIG. 6 is a flowchart illustrating an example of an autofocus (AF) operation according to this embodiment.

Referring now to FIG. 6, a description will be given of an example AF operation according to this embodiment. FIG. 6 is a flowchart illustrating an example AF operation according to this embodiment. Each step in FIG. 6 is mainly executed by the system control unit 218 or the lens system control circuit 205.

This flow starts when the AF operation is started. First, in step S601, the acquiring unit 218*a* of the system control unit 218 acquires the sensor center coordinates (center position of the image sensor) of the camera body 100. The acquiring unit 218*a* also acquires the lens optical-axis coordinates (the optical axis position of the left-eye optical system 301L and the optical axis position of the right-eye optical system 301R) of the lens unit (VR lens) 300.

Figure 7:
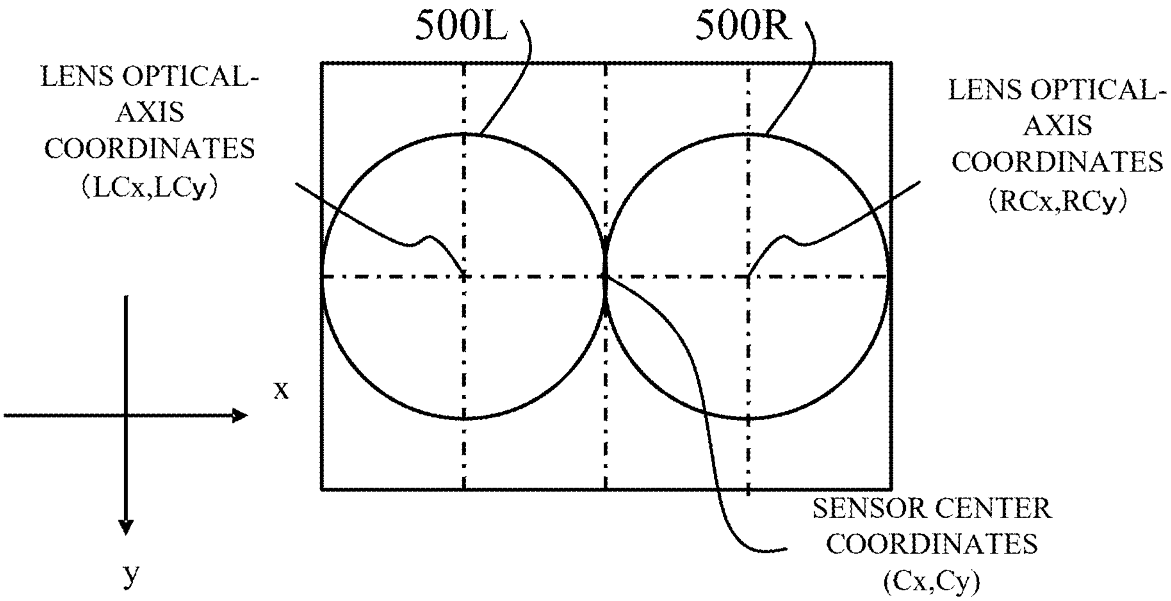
FIG. 7 explains sensor center coordinates and lens optical-axis coordinates according to this embodiment.

Referring now to FIG. 7, a description will be given of the sensor center coordinates and the lens optical-axis coordinates. FIG. 7 explains the sensor center coordinates and the lens optical-axis coordinates. As illustrated in FIG. 7, on the imaging surface, the central position of the imaging area on the image sensor is different from the position of the first optical axis OA1 of the right-eye optical system 301R and the position of the second optical axis OA2 of the left-eye optical system 301L. The system control unit 218 acquires sensor center coordinates (Cx, Cy) and acquires optical-axis coordinates (LCx, LCy) of the left-eye optical system 301L and optical-axis coordinates (RCx, RCy) of the right-eye optical system 301R as the lens optical-axis coordinates. The lens optical-axis coordinates are acquired by communication between the camera body 100 and the lens unit 300 after the lens unit 300 is attached, or are stored in the internal memory of the camera body 100.

Next, in step S602, the system control unit 218 sets a plurality of AF areas (AF frames) according to the optical-axis coordinates of the left-eye optical system 301L and the right-eye optical system 301R. As described above with reference to FIGS. 5A and 5B, the system control unit 218 sets the AF area (first AF area) 501R and the AF area (second AF area) 501L. For the lens optical-axis coordinates (central image height), two AF areas are set with the optical-axis coordinates (LCx, LCy) and (RCx, RCy) as the center coordinates, as illustrated in FIG. 5A. In setting an AF area at an image height other than the lens optical-axis coordinate (central image height) as illustrated in FIG. 5B, the system control unit 218 sets two AF areas (first and second AF areas) whose central coordinates are coordinates obtained by using the same shift amount from the two lens optical-axis coordinates. For example, two AF areas are set whose central coordinates (image height positions) are coordinates (LCx+x, LCy) and (RCx+x, RCy) obtained by using the same shift amount x from the two lens optical-axis coordinates. The system control unit 218 may also set positions where the same person or object is detected by object detection in the left image (500L) and right image (500R) of the display image 502 as the AF areas (first AF area and second AF area) of the two optical systems.

Next, in step S603, the system control unit 218 (acquiring unit 218*a*) acquires the focus detection result (first defocus amount) in the AF area 501R and the focus detection result (second defocus amount) in the AF area 50L set in step S602.

Next, in step S604, the system control unit 218 determines a main frame (main area) to be adopted as the focus detection result (defocus amount) to be used for lens drive control from among the plurality of focus detection results (first defocus amount and second defocus amount) acquired in step S603. As described above with reference to FIG. 8C, in a case where the lens optical-axis coordinates (image heights of the AF areas) shift from the sensor center coordinates, an AF area farther from the sensor center coordinates is more likely to be able to provide higher accuracy AF. Thus, the example illustrated in FIG. 5B may perform lens drive control using the image height (RCx+x, RCy) located in the right image (500R) and farther from the sensor center coordinates as the main frame.

Thus, the control unit 218*b* in this embodiment determines whether to use the first defocus amount or the second defocus amount in controlling the imaging optical system, according to information about the first optical axis OA1 of the first optical system and information about the second optical axis OA2 of the second optical system. The control unit 218*b* may determine whether to use the first defocus amount or the second defocus amount, according to the position of the first AF area and the position of the second AF area. The control unit 218*b* may determine whether to use the first defocus amount or the second defocus amount, according to the first distance from the center of the imaging area of the image sensor to the first AF area and the second distance from the center of the imaging area to the second AF area. The control unit 218*b* may control the imaging optical system using the first defocus amount in a case where the first distance is greater than the second distance, and may control the imaging optical system using the second defocus amount in a case where the second distance is greater than the first distance.

As described above, in a case where the pupil plane position of the lens unit 300 is short or long, a performance difference increases due to the image height position. Thus, for example, the pupil plane position of the lens unit 300 may be acquired by communication, and the AF area may be selected according to the pupil plane position.

In this embodiment, the AF area selecting method (determination method) may be different between the case where an imaging optical system (VR lens, first lens apparatus) having a first optical axis OA1 and a second optical axis OA2 as illustrated in FIG. 3 is attached and the case where an imaging optical system (second lens apparatus) having a single optical axis is attached. Thereby, highly accurate focus detection can be achieved regardless of the type of imaging optical system attached.

As a display format, only the AF frame (AF area) selected as the main frame may be displayed, or, for example, the main frame may be displayed with a solid line and the other frame may be displayed with a dotted line as illustrated in FIGS. 5A and 5B. Thereby, the user can recognize which frame has been used as the main frame for AF.

In this embodiment, the display unit 108 may be configured to display either information regarding the first AF area or information regarding the second AF area according to a user's selection. In a case where a difference between the first defocus amount and the second defocus amount is greater than a predetermined amount, the control unit 218*b* may control the imaging optical system using the first defocus amount corresponding to the first AF area or the second defocus amount corresponding to the second AF area displayed on the display unit 108. In a case where the first distance from the center of the imaging area to the first AF area and the second distance from the center of the imaging area to the second AF area are equal to each other, the control unit 218*b* may control the imaging optical system using the defocus amount corresponding to one of the AF areas displayed on the display unit 108.

Next, in step S605, the system control unit 218 drives the lens using the focus detection result (defocus amount) for the main frame acquired in step S604. Then, the AF operation ends.

This embodiment can provide an image pickup apparatus, its control method, and a storage medium, each of which can achieve high AF accuracy in controlling two optical systems arranged in parallel with each other.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that the disclosure is not limited to the example embodiments. The scope of the following claims is to be accorded the broadest interpretation so as to encompass all such modifications and equivalent structures and functions.

This application claims priority to Japanese Patent Application No. 2024-072020, which was filed on Apr. 26, 2024, and which is hereby incorporated by reference herein in its entirety.

What is claimed is:

1. An image pickup apparatus comprising:

an image sensor having a plurality of pixels configured to receive light beams passing through a plurality of different partial pupil areas in an imaging optical system; and a processor configured to acquire a defocus amount of the imaging optical system based on a pair of signals from the plurality of pixels and to control the imaging optical system based on the defocus amount, wherein in a case where the imaging optical system is a first lens apparatus having a plurality of optical axes and includes a first optical system and a second optical system arranged in parallel with the first optical system, the processor is configured to:

control the imaging optical system based on one of a first defocus amount in a first autofocus (AF) area by the first optical system or a second defocus amount in a second autofocus (AF) area by the second optical system, and determine whether to use the first defocus amount or the second defocus amount in controlling the imaging optical system according to information on a first optical axis of the first optical system and information on a second optical axis of the second optical system.

2. The image pickup apparatus according to claim 1, wherein the processor is configured to determine whether to use the first defocus amount or the second defocus amount according to a position of the first AF area and a position of the second AF area.

3. The image pickup apparatus according to claim 2, wherein the processor is configured to determine whether to use the first defocus amount or the second defocus amount according to a first distance from a center of an imaging area of the image sensor to the first AF area and a second distance from the center of the imaging area to the second AF area.

4. The image pickup apparatus according to claim 3, wherein the processor is configured to control the imaging optical system using the first defocus amount in a case where the first distance is greater than the second distance, and to control the imaging optical system using the second defocus amount in a case where the second distance is greater than the first distance.

5. The image pickup apparatus according to claim 3, wherein a position of the center of the imaging area is different from a position of the first optical axis and a position of the second optical axis.

6. The image pickup apparatus according to claim 1, wherein an AF area determining method for acquiring the defocus amount that is used to control the imaging optical system is different between the imaging optical system including the first lens apparatus and the imaging optical system including a second lens apparatus having a single optical axis.

7. The image pickup apparatus according to claim 1, wherein the processor is configured to:

control a display unit so that the display unit displays information about the first AF area and information about the second AF, wherein the information about the first AF area and the information about the second AF area are displayed in different formats.

8. The image pickup apparatus according to claim 1, wherein the processor is configured to:

control a display unit so that the display unit displays information about the first AF area and information about the second AF, and display one of the information about the first AF area and the information about the second AF area in accordance with a user's selection.

9. The image pickup apparatus according to claim 8, wherein in a case where a difference between the first defocus amount and the second defocus amount is greater than a predetermined amount, the processor is configured to control the imaging optical system using the first defocus amount corresponding to the first AF area or the second defocus amount corresponding to the second AF area displayed on the display unit.

10. The image pickup apparatus according to claim 8, wherein in a case where a first distance from a center of an imaging area of the image sensor to the first AF area and a second distance from the center of the imaging area to the second AF area are equal to each other, the processor is configured to control the imaging optical system using the first defocus amount corresponding to the first AF area or the second defocus amount corresponding to the second AF area displayed on the display unit.

11. A control method of an image pickup apparatus having an image sensor having a plurality of pixels configured to receive light beams passing through a plurality of different partial pupil areas in an imaging optical system, the control method comprising:

acquiring a defocus amount of the imaging optical system based on a pair of signals from the plurality of pixels; and controlling the imaging optical system based on the defocus amount, wherein in a case where the imaging optical system is a first lens apparatus having a plurality of optical axes and includes a first optical system and a second optical system arranged in parallel with the first optical system, the controlling the imaging optical system includes:

controlling the imaging optical system based on one of a first defocus amount in a first autofocus (AF) area by the first optical system or a second defocus amount in a second autofocus (AF) area by the second optical system, and determining whether to use the first defocus amount or the second defocus amount in controlling the imaging optical system according to information on a first optical axis of the first optical system and information on a second optical axis of the second optical system.

12. A non-transitory computer-readable storage medium storing a program that causes a computer to execute the control method according to claim 11.

* * * * *